Figure 3:
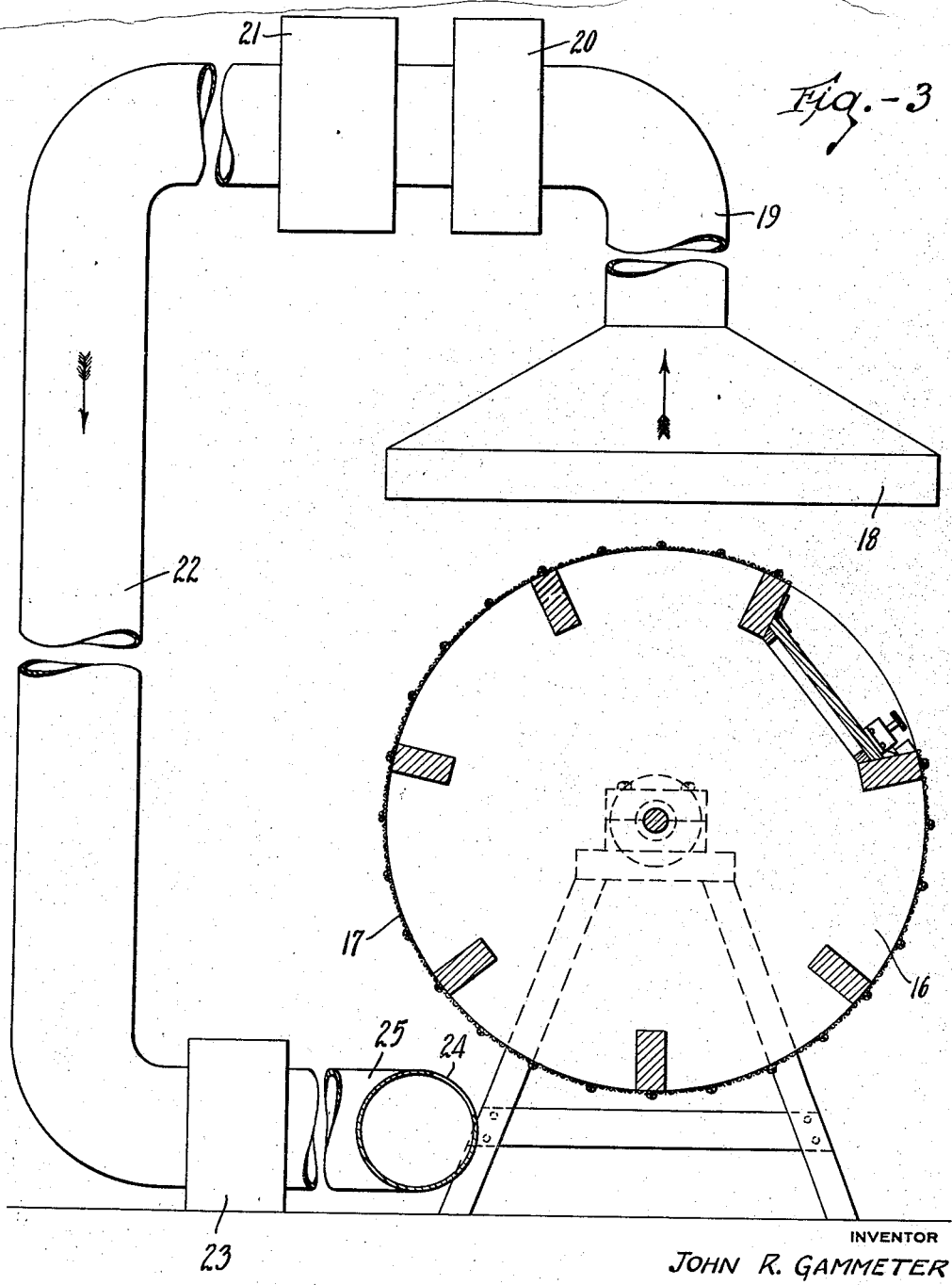

June 27, 1939.  J. R. GAMMETER  2,163,784
METHOD OF TREATING DIPPED RUBBER ARTICLES
Filed Jan. 18, 1937  2 Sheets-Sheet 1
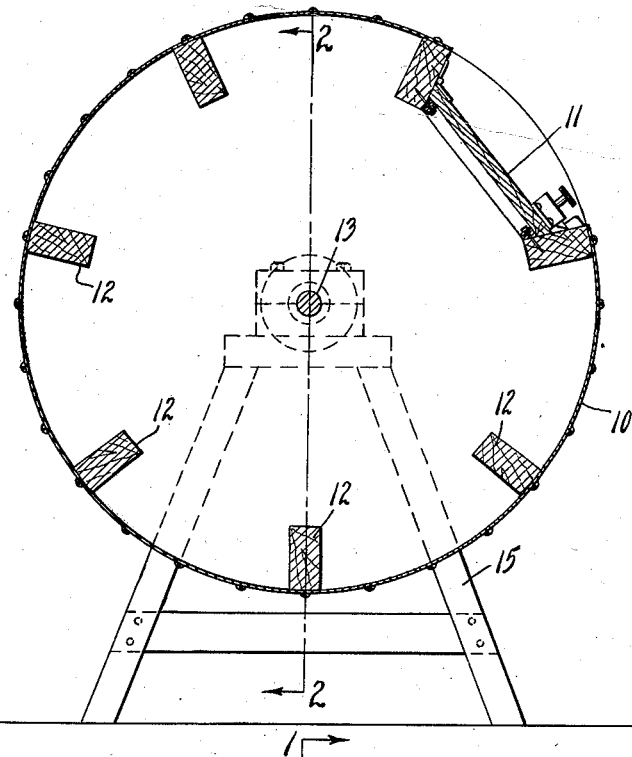
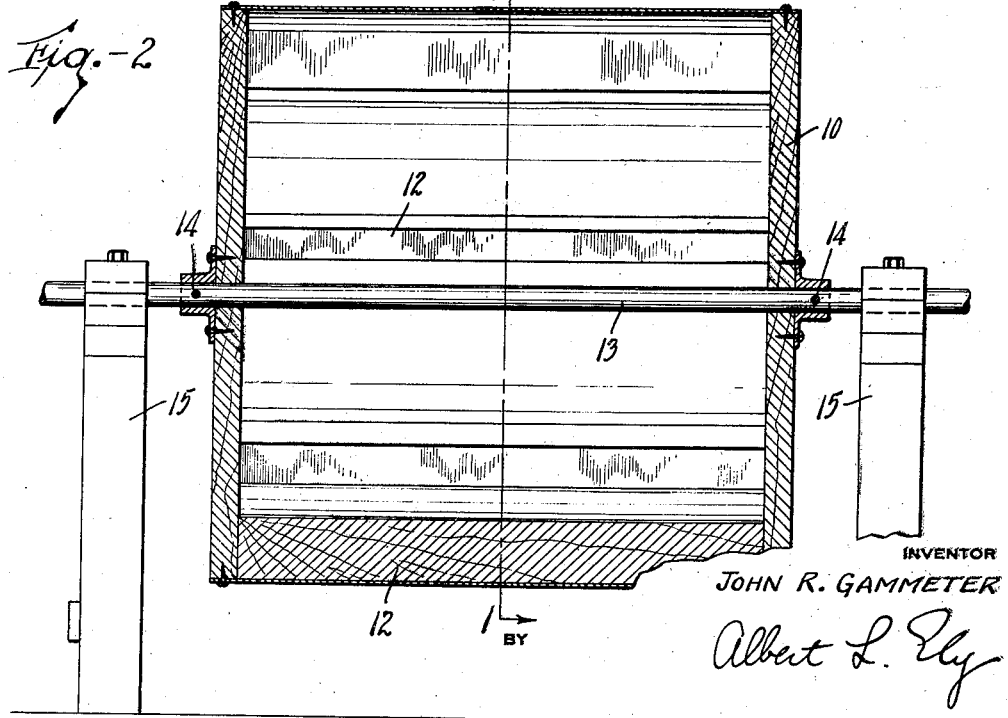
INVENTOR
JOHN R. GAMMETER
Albert L. Ely
ATTORNEY June 27, 1939.   J. R. GAMMETER   2,163,784
METHOD OF TREATING DIPPED RUBBER ARTICLES
Filed Jan. 18, 1937   2 Sheets-Sheet 2

INVENTOR
JOHN R. GAMMETER
BY
ATTORNEY

Patented June 27, 1939

2,163,784

UNITED STATES PATENT OFFICE 2,163,784

METHOD OF TREATING DIPPED RUBBER ARTICLES

John R. Gammeter, Akron, Ohio

Application January 18, 1937, Serial No. 121,108

5 Claims. (Cl. 18—58)

This invention relates to an improved method of treating dipped rubber articles such as finger cots, balloons, prophylactics and the like which are made from natural or artificial aqueous dispersions of rubber, such as rubber latex.

The objects of the invention are to improve the drying and curing of the rubber articles whereby a better product will be obtained.

Articles of the character referred to usually are made by dipping forms, which are generally constructed of dense, impervious material such as metal, porcelain or glass, into a rubber dispersion a sufficient number of times to acquire a deposit of the desired thickness thereon. These deposits are then cured by passing the forms with the deposits thereon through a vulcanizing medium such as hot water. Subsequently the articles formed by the deposits are removed from the forms. In my Patent No. 2,021,299, granted November 19, 1935, I have described and claimed a method and apparatus for making dipped rubber goods in the manner referred to.

I have now discovered that a much better product, both as to quality and length of life, can be obtained if the articles are not finally dried and cured on their forms, but are only partially dried and cured thereon, the final drying and curing operations taking place after removal from the forms. Also, the articles preferably are agitated in the presence of talc or the like during the drying operation, and are also agitated during the final curing operation.

In the drawings I have illustrated apparatus which may be used in the drying and curing operations, but it will be understood that any other suitable apparatus may be utilized or the agitation may be accomplished manually.

In the drawings:

Fig. 1 is a vertical transverse section through a tumbling barrel used in drying the product taken substantially on line 1—1 of Fig. 2, Fig. 2 is a vertical longitudinal section through same taken substantially on line 2—2 of Fig. 1, and Fig. 3 is a vertical transverse section through a tumbling barrel used in curing the product, means being shown in elevation (broken away in part) for heating the product and for drawing off excess talc.

In practicing my invention I dip the formers for the product in a suitable aqueous dispersion of rubber such as is disclosed in my said prior patent, the manner and means for dipping being fully explained in said patent. I may also partially dry and partially cure the deposits on the formers by the same means disclosed in said patent, although any suitable means may be utilized as long as the drying and curing are not allowed to become complete. Preferably the deposits are about 75% cured although this percentage may vary with different types of dispersions; and, of course, the extent to which the deposits are dried may also vary with different types of dispersions. In fact, I prefer deliberately to lubricate the deposits with water just prior to stripping them from their formers in the manner disclosed in the copending application of Rollyn Van Hyning, Serial No. 121,125, filed January 18, 1937. I also prefer to strip the articles from the formers in the manner described in said copending application, but any suitable method of stripping may be employed as long as the rubber articles are removed in an unrolled condition with their proper side out. If a method of stripping is employed which rolls up the articles or turns them inside out, they should be restored to their proper elongated condition before continuing their treatment.

The partially cured and partially dried elongated rubber articles are now subjected to agitation and sprayed or otherwise covered with talc or the like. This step may be performed in a tumbling barrel 10 which is completely closed and is provided with a latchable door 11 through which a plurality of the articles are placed in the barrel. Enough talc is utilized so that the outside of the articles becomes completely covered and some of the talc will find its way inside the articles. A plurality of spaced longitudinal baffles 12 are arranged in the barrel and a rotatable shaft 13 extends through the barrel, being secured to the latter as at 14 and being journaled in suitable posts 15. Any desired means (not shown) may be used to rotate the barrel and agitate the rubber articles inside. Preferably a speed of about 32 R. P. M. is employed.

The articles are allowed to remain in the rotating barrel for about one hour and the temperature preferably is about 80° F., not sufficient to effect a cure which is not desired at this time. The talc plays a prominent part in drying the articles since it absorbs a substantial amount of the moisture therefrom. Furthermore the weight of talc that finds its way inside the articles, plus rotation and agitation of the mass of articles tends to fluff out the latter to their natural state. When the articles are ready to be removed from barrel 10 they are about 90% dry.

Next, the articles are ready to be finally vulcanized and dried and are transferred to another tumbling barrel 16, similar to and rotatable in the same manner as barrel 10, except that barrel 16 is covered with a screen 17 of suitable mesh to permit any excess talc on the articles to be drawn off through the screen. A canopy or hood 18 is arranged over barrel 16 and is connected through pipe 19 with a fan 20 which draws off excess talc from the articles being rotated in barrel 16. Fan 20 also acts as a blower and blows the talc and other impurities in the air into a collector 21. Clean air is then blown by the fan, through pipe 22 and through a heater 23, into contact with the articles in the barrel. The heated air passes through an opening 24 in a pipe 25 connected to the heater. The air circulating through the articles is preferably at a temperature about 140° F. and the articles are rotated and agitated in this temperature for about one hour. The articles are completely dried during this operation and additional fluffing out thereof takes place. Also, the articles become substantially completely vulcanized or cured during this final operation. By substantially completely vulcanized I mean that practically all of the articles are fully vulcanized, while some may need to remain at about room temperature for a period of time. In order to play safe, I prefer to permit all of the articles to remain in an atmosphere at room temperature after removal from barrel 16, for about 24 hours before packing.

It has been found that my method of treating dipped rubber articles results in a very much improved product both as to quality and length of life, and the method is relatively economical in operation.

Modifications of the invention may be resorted to without departing from the spirit thereof or from the scope of the subjoined claims.

What is claimed is:

1. The method of treating rubber articles which have been formed by dipping shaped forms into an aqueous dispersion of rubber which comprises partly drying and partly vulcanizing said articles while they are on said forms, effecting further drying of the articles by contact thereof with talc, and then completing the drying and vulcanization of the articles and effecting the removal of talc therefrom by exposing the articles to a current of heated air.

2. The method of treating rubber articles which have been formed by dipping shaped forms into an aqueous dispersion of rubber which comprises subjecting partly dry and partly vulcanized articles to the action of talc to effect further drying thereof, and then subjecting the articles to a current of heated air to complete the drying and vulcanizing of the articles and to remove surplus talc therefrom.

3. The method of treating rubber articles consisting of deposits of aqueous dispersed rubber on shaped forms which comprises partly drying and partly vulcanizing the articles while on said forms, treating the articles with talc to advance the drying thereof, and finally completing the drying and vulcanization of the articles and effecting the removal of talc therefrom, after removal from the forms, by agitating the articles while exposing them to a current of heated air whereby the talc is carried off by said air.

4. The method of treating partly dry and partly vulcanized articles of aqueous dispersed rubber that are covered with talc which comprises agitating said articles in a current of heated air to complete the drying and vulcanization of the articles and to remove the talc therefrom.

5. The method which comprises impelling a current of heated air in an endless course, agitating partly dry partly vulcanized articles of aqueous dispersed rubber covered with talc in one region of said course, to further dry and vulcanize the articles and remove the talc therefrom, and separating the talc from the air in another region of said course.

JOHN R. GAMMETER.